United States Patent Office 3,335,015
Patented Aug. 8, 1967

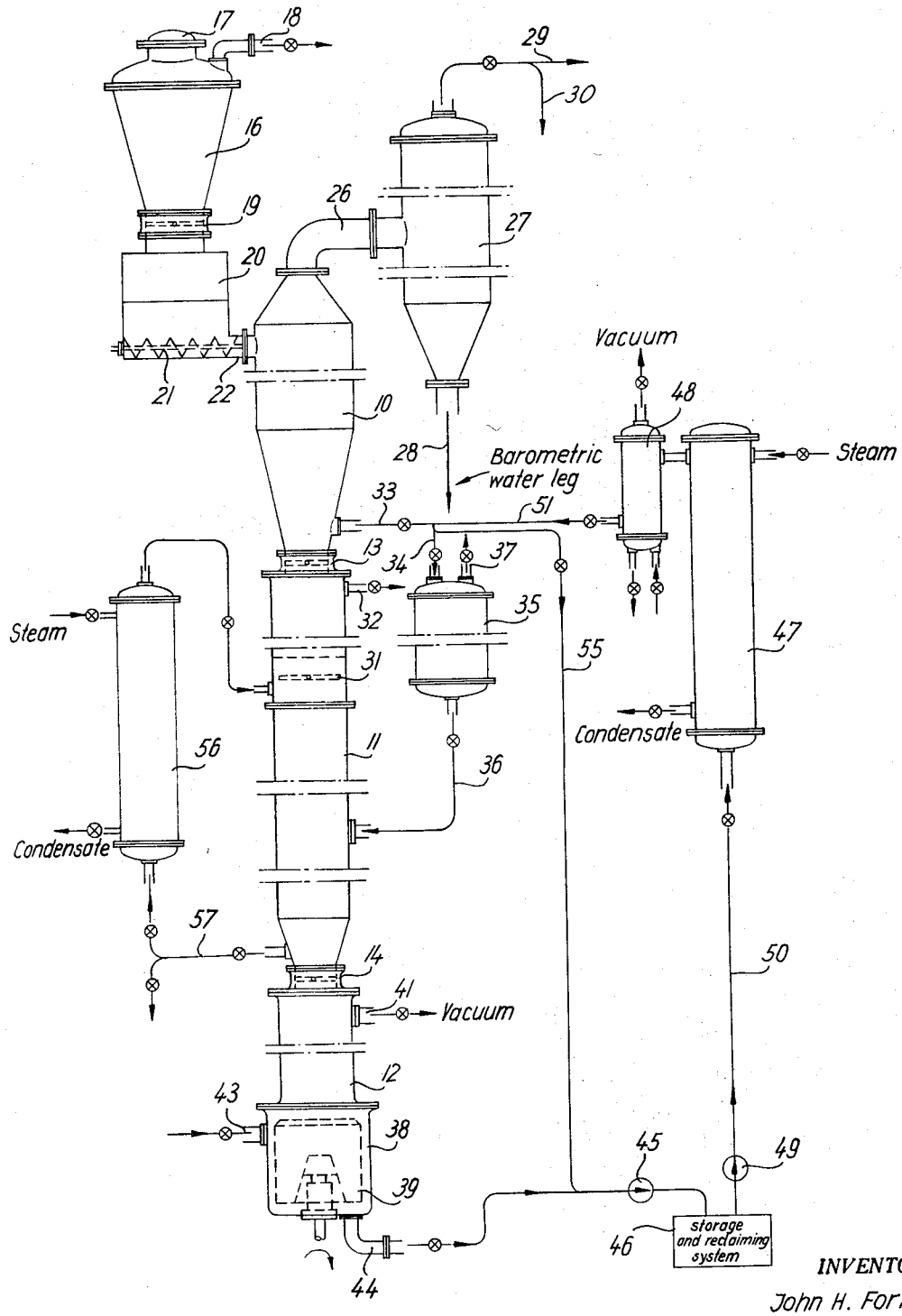
FIG_1_

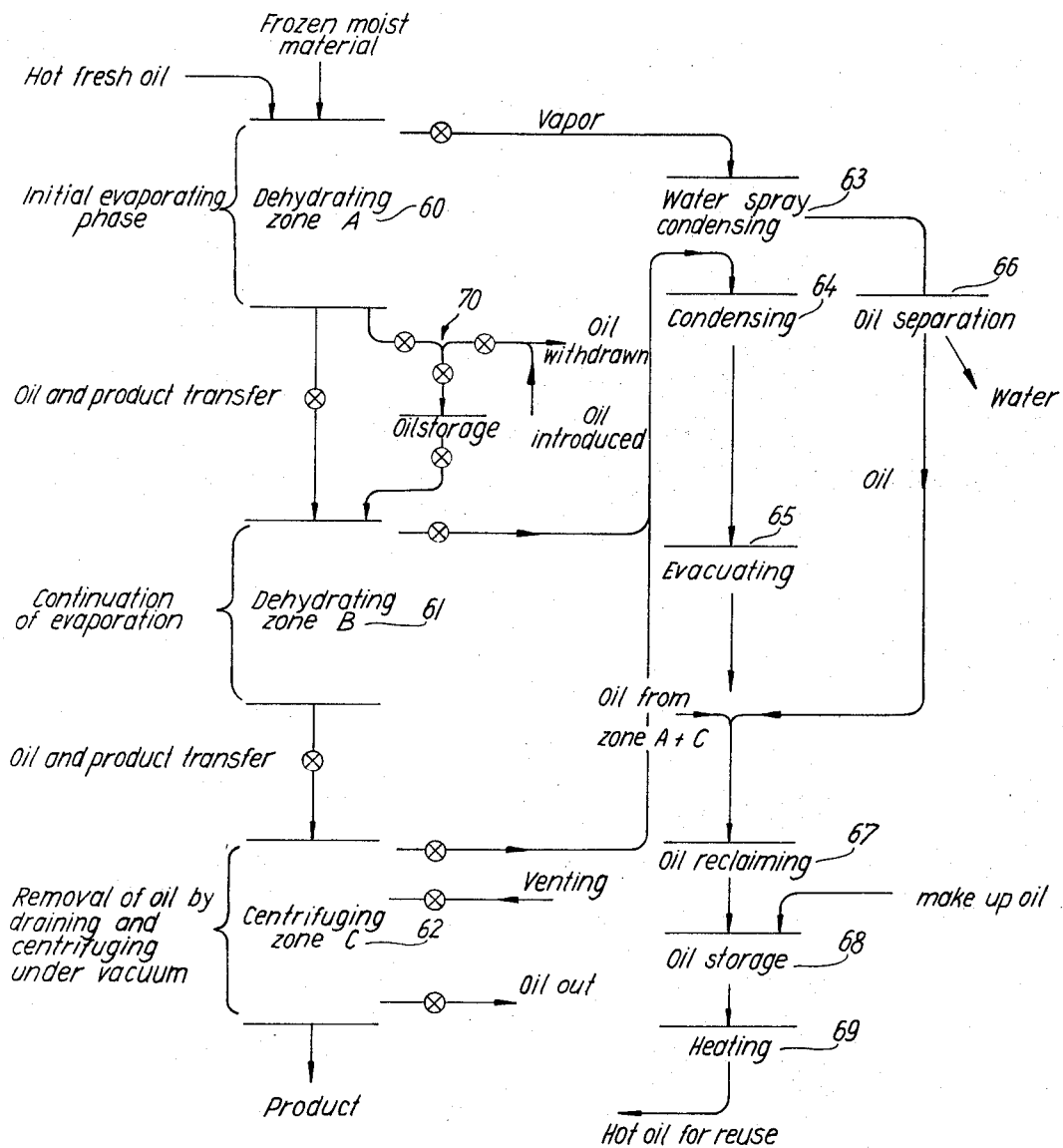
FIG_2_

3,335,015
METHOD OF DEHYDRATING MOIST
MATERIALS
John H. Forkner, Fresno, Calif., assignor to The Pillsbury Company, Minneapolis, Minn., a corporation of Delaware
Filed Dec. 6, 1961, Ser. No. 157,478
6 Claims. (Cl. 99—199)

This invention relates generally to methods and apparatus for the dehydration of various moist food materials. More specifically it pertains to dehydration processes of the type in which the moist food or similar organic materials are treated by contact with hot oil, under partial vacuum.

In my co-pending application, Ser. No. 157,538, filed simultaneously herewith, entitled Dehydrating Method and Product, there is disclosed a method for the dehydration of a wide variety of moist food materials, involving contacting chilled food particles with hot oil under partial vacuum. The oil may be of vegetable or animal origin, with or without refining such as deodorizing, decoloring or hydrogenation. It may be a wax or wax like material, such as beeswax, or a blend of a vegetable or animal oil with such a wax. In typical instances the initial temperature of the oil may be within the range of 240 to 600° F. (preferred range 325 to 440° F.). The applied partial vacuum can be of the order of 22 to 29 inches mercury column. Initial rapid heat transfer from the hot oil to the moist food material quickly drops the temperature of the oil over a short period of the order of from ½ to 4 minutes. Thereafter the dehydration cycle is completed at a lower temperature level, as for example, within the range of 170 to 230° F. At the end of the dehydrating cycle the material may be treated as by centrifuge, to eliminate excess oil, the centrifuging preferably being applied while the partial vacuum is maintained. At or near the end of the centrifuging operation, the material may be cooled below the solidification temperature of the oil by evaporative cooling. The method just described produces high grade dehydrated products, which are superior to products dehydrated by vacuum evaporation or other conventional methods.

In my co-pending application, Ser. No. 157,449, filed simultaneously herewith, and entitled Dehydrating Method and Apparatus, there is disclosed apparatus of the batch type suitable for carrying out the foregoing method. The apparatus consists of a tank of substantial height having provision for introduction and withdrawal of oil, and for the removal of the product at the end of the dehydrating cycle.

While apparatus of the batch type for carrying out the foregoing method is workable and commercially practical, the capacity of batch equipment of a given size is limited. Also processing costs cannot be reduced beyond certain limits, due to such factors as labor cost and power consumption, which are inherent with batch equipment.

It is an object of the present invention to provide apparatus for carrying out the foregoing method, which makes possible relatively low cost processing of moist food materials.

Another object of the invention is to provide a method and apparatus of the above character which can be controlled to produce a uniformity of final product, and in which substantially all of the major operations can be cycled automatically.

Another object is to provide a method and apparatus wherein partial vacuum can be maintained in the main treatment space, independent of release of vacuum with respect to the final product.

Additional objects and features of the invention will appear from the following description in which the preferred embodiment has been set forth in detail in conjunction with the accompanying drawing.

Referring to the drawing:
FIGURE 1 is a schematic view in side elevation illustrating equipment in accordance with the present invention.
FIGURE 2 is a flow diagram illustrating my method when carried out by use of the apparatus shown in FIGURE 1.

The apparatus shown in FIGURE 1 consists of a plurality of tanks or vessels 10, 11 and 12, which are disposed at successively lower levels, whereby material may move from one tank to the next. A valve 13 is interposed between the lower end of tank 10 and the upper end of tank 11, and may be of the butterfly type as illustrated. When closed this valve interrupts communication between the tanks. When open it permits material (i.e. oil and material being dehydrated) to pass from one tank to the next. A similar valve 14 is shown interposed between the tank 11 and tank 12.

Means are provided for introducing a predetermined charge of moist frozen food material into the tank 10. The charging means can consist of a hopper 16 having a normally sealed cover 17, which can be removed for introducing the charge. Pipe 18 connects the hopper 16 with suitable evacuating means for maintaining a partial vacuum, as for example a vacuum corresponding to 25 to 29 inches mercury column. A valve 19, which can be of the butterfly type, is interposed between the lower end of hopper 16 and the housing 20, the latter being of sufficient size to hold all of the charge. The lower portion of this housing is shown provided with a rotating feed screw 21, which serves to move the charge through the annular housing portion 22, into the upper portion of the tank 10.

A pipe 26 connects the upper portion of tank 10 to suitable vapor condensing and evacuating means. This equipment may consist of a condenser 27 of the water-spray type, which is sealed by a barometric leg 28. The vacuum line 29 from the condenser 27 may connect with a second condenser of the tube type, which in turn is connected to a suitable evacuating pump. Line 30 serves to deliver any carry over of liquid into a trap (not shown).

Between the upper and lower ends of tank 11, there is a barrier screen 31. This screen is mounted to rotate 90° about its axis. In the horizontal position shown in FIGURE 1, oil may circulate through the openings of the screen, but the openings are of such a size that the material being dehydrated cannot pass therethrough. When the screen is turned 90° from the position shown in FIGURE 1, that is to a vertical position, movement of material is not restricted.

Line 33 is shown connected with the lower portion of tank 10, and serves for introducing or removing oil as desired. One branch 34 of line 33, together with tank 35 and line 36, forms a by-pass whereby oil can be withdrawn from tank 10 and introduced into tank 11 at a level below the screen 31. Line 37 leading from tank 35, connects with the evacuating means.

The upper part of tank 11 is in continuous communication with the evacuating means, through pipe 32. This means preferably is independent of the system connected to pipe 26, and can consist of a suitable condenser and vacuum pump.

The lower portion 38 of the tank 12 is a housing for the centrifuge basket 39. Line 41 connects the upper part of tank 12 to evacuating means. Here again it is desirable to employ means independent of that connected to pipes 26 and 32, such as a suitable evacuating pump of the jet type that may be capable of applying a vacuum somewhat higher than that normally applied to tanks 10 and 11. Line 43 is employed for breaking the vacuum, and may connect to a source of gas which is relatively anhydrous, such as dehumidified air, or anhydrous inert gas like nitrogen, or the like.

Pipe 44 connects with the lower part of the housing 38, and serves to remove oil at the end of the dehydrating cycle. Liquid pump 45 is shown for removing oil through line 44, and delivering it to a storage and oil reclaiming system 46. The reclaiming system may include one or more centrifuges for removing solids, together with one or more clarifying filters.

Heat exchange means is provided for heating oil to a desired temperature level. The exchange means in this instance is in the form of two units 47 and 48 which are serially connected. Pump 49 and line 50 deliver clarified oil from the reclaiming system 46 to the first heat exchange unit 47. Line 51 leading from the second exchange unit 48, serves to introduce hot oil into the tank 10 by way of pipe 33. As will be presently explained, one may withdraw oil from tank 10 and deliver it directly to the storage and reclaiming system 46. For this purpose pipe line 55 connects between line 33 and the inlet side of pump 45. Line 55 (with line 33 closed) can also be used when one may desire to recirculate oil through the heat exchange units 47 and 48.

A separate heat exchange unit 56 is shown connected to tank 11, and may be used to maintain a desired oil temperature. Line 57 leading from the lower portion of tank 11 and connected to heat exchanger 56, may be employed to draw off a part or all of the free oil, in instances where it is desired to partially or entirely replace the oil at this stage of the method.

Without reference to particular materials, or to particular temperature and time factors, operation of the apparatus shown in FIGURE 1 is as follows: A charge of frozen moist food material is introduced into the hopper 16, after which the cover 17 is reapplied, and the frozen material evacuated by connecting line 18 with evacuating means. After such evacuation which serves to deaerate the material, valve 19 is opened to deliver the material into the housing 20. A measured quantity of hot oil is introduced into the tank 10 from the storage and reclaiming system 46, by way of pump 49, line 50, heat exchangers 47 and 48, and lines 51 and 33. The interior of the tank 10 is evacuated by virtue of the connection through 29 to evacuating means. The evacuating means functions continuously, and this is likewise true of the spray condenser 27. After a predetermined quantity of the hot oil has been introduced into tank 10, further introduction is discontinued, and the feed screw 21 is placed in operation to deliver the charge of frozen material into the tank and into the oil body. This starts the first evaporating phase, which is characterized by creation of a foam-like medium comprising a mixture of vapor and hot oil, the medium having a relatively large volume. The volume may for example be from 3 to 10 times or more the original volume of the oil. After a short interval the foam subsides, and the charge is now approaching the time of transfer to the second tank 11. In the first part of the initial phase, the material tends to be buoyant but is dispersed in the foam-like medium because of violent agitation. As the oil subsides, the material migrates to the upper part of the oil body. At the end of the initial phase in tank 10, a substantial part of the oil is withdrawn from the lower part of the oil body, through pipe 33, and a part of this oil is stored in by-pass tank 35, and another part withdrawn by way of line 55 to the storage and reclaiming system. With the screen 31 in vertical or full open position valve 13 is opened to permit the partially dehydrated product, together with the remaining oil, to pass downwardly into the tank 11. Tank 11 at that time is likewise evacuated, because it is connected to evacuating means through line 32. Valve 13 is now closed, and screen 31 returned to its horizontal position. A quantity of hot clarified oil from heat exchange unit 48 is now supplied through line 51 to the tank 35, where it blends with the oil previously introduced in this tank, to produce an oil body of the desired temperature level. This oil is now introduced into the tank 11 through pipeline 36. Introduction of this oil body serves to raise the oil in the tank 11 to a level above the screen 31. It may be explained that in the tank 11, the material undergoing dehydration is buoyant. Without restraining means, such as the screen 31, the buoyant material would float as a thick mat upon the surface of the oil, thus elevating some of the particles above the oil line and preventing effective transfer of heat from the oil to all of the individual particles. Screen 31 when utilized in the manner described above, holds the buoyant particles below the oil level, where they are effectively contacted with the hot oil for good heat transfer.

Within the tank 11 evaporation of the material continues, but at a lower temperature level. Circulation of oil through heat exchanger 56 can be established to maintain the temperature level desired. Also, during or near the end of this part of the cycle, all or a part of the oil can be withdrawn and another oil substituted. At the end of the dehydrating cycle, butterfly valve 14 is opened, thus delivering the dehydrated material and oil into the lowermost tank 12. Tank 12 is at this time evacuated by virtue of its connection to an evacuating means through pipe 41. After transfer of the charge to tank 12, valve 14 is closed, and pump 45 placed in operation, with line 44 open, to withdraw oil from the lower part of the tank housing 38. After the major part of the free oil has thus been removed from tank 12, including oil that drains from the material, the centrifuge basket 39 is rotated whereby additional oil is removed by centrifugal force. Such oil likewise is removed through the pipe 44.

After the centrifuging operation has been completed, the pipe connection 41 to the evacuating means is closed, and the vacuum within the tank 12 is broken by opening the pipe line 43. As previously explained, this may serve to introduce substantially anhydrous gas into the tank 12. After the vacuum is broken the housing part 38 of the tank can be separated from the upper tank part, and the product removed from the centrifuge basket.

The partial vacuums maintained in tank 10 may for example be at a value corresponding to 24 to 28 inches mercury column immediately before the charge is introduced. Shortly after commencing introduction of the charge the vacuum may fall to a value of the order of 22 to 26 inches. Toward the end of the initial phase of dehydration in tank 10, the vacuum may rise to 26 or 28 inches. In tank 11 the vacuum at the time of transfer may be the same as in tank 10, and for the period of treatment in this tank, the vacuum can be maintained within the range of 26 to 29 inches. The partial vacuum in tank 12 should be the same as in tank 11 at the time of transfer. Thereafter it may be raised or lowered during the final drainage of oil and centrifuging. To prevent such evaporative cooling as may solidify remaining oil, the vacuum may be reduced to say 25–27 inches as the oil drains away from the product, and during the main part of centrifuging. Thereafter a higher value (e.g. 29–29½ inches) can be applied for final evaporation cooling and solidification of the oil. Application of such higher vacuum immediately before solidification also serves to somewhat expand the product and this increases its bulk volume.

The foregoing description traces the operations for one charge of material, from the time that it is introduced into the hopper 16, until it is removed from the centrifuge basket 39 at the end of the method. In practice charges of frozen material are fed successively to the hopper 16, and during the total aggregate time required for the processing of one charge, three charges are processed. In other words, immediately after a charge in tank 10 is delivered to the tank 11, and valve 13 closed, another measured quantity of hot oil is supplied to tank 10 by way of lines 51 and 33, and another charge of frozen material is introduced into the tank 10, by operation of the feed screw 21. Likewise immediately after a charge is delivered to the tank 12, through the valve 14, from tank 11, screen 31 is turned to its vertical position, and a new charge of material received from the tank 10. Thus at any one time, each of the tanks is carrying out its part of a complete dehydration cycle, but on different charges. If in a typical instance the treatment in each of the tanks requires not more than ten minutes, with the total treatment time on each charge of 30 minutes, then over a period of 30 minutes of operation three charges are processed.

Although three tanks are deemed to be sufficient and practical for most commercial installations, there may be instances where more than three tanks may be employed. Thus it is possible to divide the functioning of the tank 11 into two similar tanks, each provided with a screen 31. This may be desirable where the time required for treatment at the lower temperature level is considerably greater than the time required for treatment in either the first or the last tank.

Particular temperature and time factors, and particular operating conditions, can be selected and controlled in accordance with the material being dehydrated, and the overall results desired. The temperature of the material supplied to the hopper 16 may correspond to temperatures normally used in the frozen food industry, as for example from −40 to +20° F. The initial temperature of the oil in tank 10 at the time the material is first introduced, may range from 240 to 600° F., preferably from 325 to 440° F. At the end of the initial evaporating phase in tank 10, the oil temperature may have fallen to a value within the range of from 130° to 230° F. The time period during which initial evaporation takes place in tank 10, may be of the order of from ½ to 4 minutes.

The amount of oil withdrawn from tank 10 at or near the end of the initial phase, may vary over wide limits. In typical instances the amount removed may vary from 25 to 50% of the original oil body. After transfer into tank 11, the clarified oil introduced is at a temperature such that the overall temperature of the material being dehydrated, and of the aggregate oil body, is within a desired lower temperature range, such as from 170 to 230° F. Assuming that the material leaves tank 10 at a desired temperature level, then the clarified oil can be introduced at or about the same temperature. In most instances, however, I introduce some heat by way of the introduced clarified oil. Therefore, assuming that the temperature in tank 11 has dropped to from 130 to 190° F., then the temperature of the clarified oil is adjusted to be somewhat greater than this range, thereby supplying sufficient heat to raise the overall temperature to that desired.

In typical instances the weight of the frozen material may be from 5 to 30% of the weight of the oil body. It will be appreciated that for a given initial oil temperature a change in the amount of frozen material will modify the rate with which the oil temperature is reduced and the end temperature after a predetermined period of time.

Treatment within the tank 11 likewise may vary in accordance with conditions and requirements. In typical instances the time period of retention in tank 11 may be within a range of from 3 to 20 minutes.

Preferably the outgoing temperature from the tank 11 into tank 12 is not below about 170° F., and can be of the order of 195° F.

Within the tank 12 the free oil is removed from the material as quickly as possible, after the transfer from tank 11, such removal being carried out by pumping out the oil from below the floating particles, by drainage, and by centrifuging. This promotes good color retention of the product, which is attributed to removal of the product from surface contact with substantial amounts of free oil, the latter being at a temperature higher than that which the product tends to assume.

The flow diagram FIGURE 2 facilitates an understanding of the operating cycle. Step 60 represents the operations in tank 10, where the initial rapid evaporation takes place. In most instances from 60 to 90% of the moisture content of the material is removed in this initial phase. Step 61 represents the operations within tank 11, where dehydration is continued under vacuum at a lower temperature level. Step 62 represents the operations in tank 12 and the tank housing 39, where free oil is removed from the dehydrated material by pumping from housing 38 and by centrifuging, all with continued application of a partial vacuum. Following or near the end of centrifuging a somewhat higher vacuum can be applied for evaporative cooling. Step 63 represents the condensing of water vapor from the first step 60, with further condensing at 64 and evacuation at 65. Step 66 represents the removal of an oil fraction from the condensing water, with the return of such oil to the oil reclaiming system.

The oil reclaiming and storage operations have been indicated as including reclaiming at 67 (e.g. centrifuging and filtering) and oil storage 68. Step 69 represents heating the oil for reuse. Line 70 represents the oil bypass line formed by the tank 35 and connected piping.

It will be evident from the foregoing that I have provided a method and apparatus which functions in a semicontinuous manner, for the dehydration of various moist food materials. The equipment has a relatively high capacity for its size. The cost of installation, and the labor requirement to maintain its operation are substantially less than with apparatus of the batch type. Substantially all of the major control operations of the apparatus can be cycled automatically, thus making for uniformity with respect to treatment of successive charges, and reducing the labor factor to a minimum.

As stated in my aforesaid copending application Ser. No. 157,538, the apparatus can be used for dehydration of a wide variety of food materials, including fruits and berries, vegetables, cereals, condiments, meats, fowl and seafood.

The larger fruits like peaches, can be peeled, pitted and sliced, or cubed into pieces not bigger than ⅝ inch thick. Smaller items, such as cherries, blueberries and grapes can be cleaned and frozen without reduction in size. It is desirable that the particles be of such size that they do not weigh in excess of about 10 gms.

Fresh vegetables can be cleaned and prepared by use of conventional procedures, such as are employed in the frozen food and canning industries. Blanching, with or without sulfiting, can be applied before freezing to minimize enzymatic activity. Multiple perforating or scarifying can be applied before or after freezing, to such materials as peas, Chinese peapods and the like. Here again where the items are of substantial size, they are reduced to particles (e.g. slices or cubes) of a size suitable for processing.

Meats like beef, pork or lamb can be prepared by cutting and trimming to suitable size, followed by cooking, draining and freezing.

Fowl (e.g. chicken and turkey, etc.), can be prepared by cleaning and cooking, removal of the flesh, and cutting into pieces of suitable size, after which the flesh is frozen. Thawing and refreezing can be employed for tenderizing.

Seafood such as shrimp, cod or other fish flesh, can be prepared by cleaning and cooking, followed by freezing. In some instances cooking may be omitted.

Condiments such as fresh mushrooms, water chestnuts and the like, can be prepared by cleaning and cutting, followed by freezing. Where the source material in this category is in dry form, such as dried mushrooms, they can be cleaned and rehydrated before freezing.

Some source materials may have been processed by other methods. For example, materials like cherries may have been subjected to a conventional "glace" treatment. Pork may have been preserved as ham, or beef as corned beef. Materials like chick peas (garbanzo beans) or Japanese tree mushrooms, may have been air or sun dried, whereby they require rehydration before freezing. Dried fruits like dates, peaches or apples may have been partially dehydrated by air or vacuum drying. Vegetables like cucumbers may have been preserved by pickling.

Some materials that have been dried by conventional methods can be advantageously rehydrated, frozen and then treated by my method. Particular reference can be made to dried fruits like dates, and to dry cereal grains like wheat, corn or rice. Cereal grains may be treated to remove cortex, bran and germ portions before rehydrating.

A wide variety of fruits may be treated by my method, including fresh apples, peaches, apricots, pineapple, cherries, bananas, dates, strawberries, blueberries, and the like. Vegetables which are applicable include peas, carrots, potatoes, celery, cabbage, bean sprouts, onions, peppers, sweet potatoes, cereals and the like. Meats that are applicable include beef, pork, lamb, processed meat such as ham, corned beef, corned pork and the like. With respect to fowl, reference can be made to chicken, turkey, pheasant, duck and the like. As to seafood reference can be made to shrimp, both fresh and cooked, tuna and other fish such are commonly marketed, oysters, clams, lobsters, crab and the like. As condiments, reference can be made to mushrooms, water chestnuts and various spices and herbs. As formulated products, reference can be made to doughs or ravioli.

A wide variety of oils and fats can be used. For example, I can employ various oils and fats of vegetable or animal origin. As examples of vegetable oil reference can be made to corn, cotton seed, soy, olive, peanut, coconut, sesame, raisin seed, and the like. As examples of animal oils reference can be made to fish oil, lard, butter oil and the like. Generally, it is desirable to use oils or fats which have been refined to the point where they do not impart any undesirable odor or flavor to the product. The so-called hydrogenated oils have been used with good results, such as hydrogenated shortening fats. Preferably the oil has a melting point above atmospheric as, for example, from 102 to 150° F. Flavor-containing oil, such as butter oil and natural animal fat (e.g. chicken fat), may in some instances be used to impart a desired flavoring. Special flavoring ingredients can be introduced into the oil with retention of some such flavoring in the material undergoing treatment. At temperature levels ranging up to 400° F., and with an applied partial vacuum, more prominent vegetable and animal oils are not subject to serious breakdowns or changes in their molecular structure. Certain oils are sufficiently stable for commercial use at temperatures ranging up to 600° F., in vacuum. Some oils and/or waxes, like those of high melting point, tend to be retained to a lesser degree by the final product.

In addition to the oils and fats referred to above, I can employ edible waxes that are stable liquids at temperatures of the order employed in my method. For example, natural or refined beeswax has been used with good results. Such a wax can be blended in various amounts with a suitable oil or fat, thereby modifying certain physical characteristics of the oil. Particularly introduction of the wax raises the melting point of the oil and increases its viscosity. Also it provides a medium which is more stable and therefore better adapted for reuse, and which tends to be absorbed to a lesser extent by the product. Greater stability of the blended oil tends to increase shelf life and to better protect the product against atmospheric moisture. Another example is jojoba wax which can be blended with oil (e.g. hydrogenated shortening), and which likewise modifies the oil by increasing the melting point, lowering the smoking point, and making the oil more stable and better adapted for repeated reuse.

For an explanation of the appended claims the term oil as used therein is intended to include oils, fats and waxes (all of which are esters of fatty acids) and blends thereof, with or without hydrogenation, decolorizing, deodorizing or other refining. Also it includes other materials having characteristics similar to oils or fats, which are edible and have sufficient stability under the temperature and partial vacuums involved.

The dehydrated products produced by my method and apparatus are substantially the same as the products described in said copending application Ser. No. 157,538. In general the products are of high quality compared to products produced by conventional methods, such as ordinary vacuum drying or air drying. The dried particles have a form similar to the form of the original particles of source material, without excessive shrinkage. Color retention is excellent. With materials like mushrooms, the color changes from natural white to the brown color which mushrooms normally assume in cooking. The products readily rehydrate in warm or hot water, and after rehydration the particles have the size, form and appearance of the original source material. Microscopic analyses reveal that the fat content is distributed in the form of minute discrete masses randomly dispersed, as distinguished from plates or continuous films. In this form the fat does not inhibit rehydration, but it does have a plasticizing effect on the tissue or cell structure. Thus materials that are quite fragile when dehydrated by the freeze dry process, are relatively durable and capable of withstanding abuse, when dehydrated by my method.

The procedure used in carrying out my method can be varied in certain respects, to modify the characteristics of the final product. For example, as disclosed in my said copending application Ser. No. 157,538, at the end of the centrifuging operation various impregnating materials may be applied to the product, and thereafter the vacuum released. This results in penetration of the applied material into the pores of the product. Liquid impregnating ingredients which can be applied in this fashion include liquids containing flavoring, vitamins and the lke. Thus it is feasible before releasing the vacuum at the end of centrifuging, to immerse the material in the centrifuge in a liquid treating medium. Upon breaking the vacuum, the liquid is forced into the pores of the product, thus providing penetration. Thereafter, the product can be subjected to draining and centrifuging for the removal of free impregnating liquid. The liquid impregnating ingredients which can be applied in this fashion include oils or fats, aqueous liquids containing flavoring ingredients, alcoholic liquors, concentrated sugar syrups, and the like. One example is the impregnation of dehydrated chicken flesh with chicken fat, gelatin solution, or broth.

In addition to the impregnating ingredients referred to above, it is possible to utilize liquid solvents, applied by spray or immersion of the material after centrifuging in the vacuum, and before the vacuum has been released. Thereafter release of the vacuum serves to cause the liquid solvent to penetrate the pores of the product. A solvent can thus be used as a medium for introducing certain ingredients in the product, such as certain vitamins. Thereafter excess solvent can be removed by centrifuging and evaporation.

Materials in the vapor phase can also be applied, such as aromatic flavoring. Thus seasoning vapor is introduced into the space occupied by the centrifuge basket at or near the end of the centrifuge operation, but before rotation of the basket is terminated and before or during breaking of the vacuum. Some aromatic or volatile flavoring ingredients can thus be caused to penetrate the pores. Instead of a vapor, atomized or spray droplets of a normally liquid seasoning can be applied in the same manner.

In some instances one may desire to produce products having an oil or fat content substantially higher than products obtained by the procedure described above. In such instances, the centrifuging operation is omitted, and the product is removed after removal of free oil from below the centrifuge basket and after the vacuum is released.

An example of my method is as follows: A moist food material, such as fresh blueberries, is prepared by cleaning, freezing by the individual quick-freeze method and storage at 0° F. Hot hydrogenated cotton seed oil is supplied to tank 10 at 360° F. A charge of fresh berries is introduced into hopper 16. The tank 10, hopper 16 and housing 20 are evacuated to about 28 inches mercury column. Also tank 11 is continuously evacuated. The frozen charge is introduced from hopper 16 into housing 20 by opening valve 19. Thereafter valve 19 is closed so that a new charge can be received in hopper 16. The frozen charge is introduced into tank 10 by operation of feed screw 21, whereby a mixed phase foam is formed in tank 10 that is many times the volume of the oil. For a short interval the vacuum falls to about 22 to 25 inches, and then returns to about 26–28 inches. After about 5 minutes in tank 10, the material is ready for transfer to the tank 11. Tank 11 is prepared by delivering all material and oil from a previous operation through valve 14 to tank 12. A specified amount, such as 25%, of the oil in tank 10 is drawn off through pipe 33 and sent to the reclaiming system. A second 25% is drawn off and stored in tank 35, some oil being permitted to remain with the product in tank 10. Valve 13 is opened to deliver the product and remaining oil into tank 11, after which valve 13 is closed. Screen 31 is turned from its vertical to horizontal position. Hot clarified oil at 360° F. is drawn from heater 48 and delivered into tank 35 to mix with the initial oil and to raise the temperature of the oil mixture to about 210° F. This oil mix is then delivered to tank 11 through line 36 to produce an oil body at a temperature level of about 195° F. Dehydration proceeds in tank 11 with the buoyant product being restrained under the oil level by screen 31. The total treatment time in tank 11 may be about 10 minutes, during which time some oil is circulated through heater 56 to maintain the oil temperature at 195° F. At the end of the cycle valve 14 is opened to deliver all of the material into tank 12 and housing 38, after which valve 14 is closed. Oil is withdrawn through pipe 44 until all free oil has been removed and the oil has had an opportunity to drain from the product. Then centrifuge basket 39 is rotated for a period of 3 minutes to remove further free oil. After centrifuging, dehumidified air is admitted through pipe 43 to break the vacuum, after which housing 38 is detached and the product removed. Thereafter transfer of each charge from tank 10 to tank 11 is immediately followed by recharging tank 10 with hot oil and frozen material. Discharge of material and oil from tank 11 to tank 12 is immediately followed by a new charge being received from tank 10. After the first product has been removed from the centrifuge basket, housing 38 is again attached to tank 12 and evacuated, after which it is in readiness for receiving material from tank 11.

I claim:

1. In a method for the dehydration of moist materials, said method being characterized by the use of means forming a plurality of separate zones, the steps of recurrently introducing charges of hot oil and moist material to be dehydrated into the first of said zones, holding each of the charges within the first zone with application of a partial vacuum to carry out an initial evaporating phase, the temperature of the hot oil being substantially above the vaporization point of water at the applied partial vacuum, and transferring the charges successively from the first zone to a succeeding second zone, wherein evaporation is continued with maintenance of a partial vacuum, the temperature of the oil in said last named zone being within a range susbtantially lower than the initial temperature of the oil in the first named zone, but substantially above the aforesaid vaporization point.

2. A method as in claim 1 in which at the end of each evaporating phase in the first named zone, some of the oil of the charge is withdrawn, and hot oil introduced into the last named zone in place of said withdrawn oil.

3. A method as in claim 2 in which the hot oil introduced into the last named zone to take the place of the withdrawn oil, is clarified.

4. In a method for the dehydration of moist materials, said method being characterized by use of means forming at least three separate zones, the steps of recurrently introducing charges of hot oil and moist material to be dehydrated into the first zone, holding each of the charges within the first zone with application of a partial vacuum to carry out an initial evaporating phase, the initial temperature of the hot oil in said first zone being substantially above the vaporization point of water at said applied partial vacuum, transferring the charges successively from the first zone to a succeeding zone where evaporation with maintenance of a partial vacuum is continued, the temperature of the oil in said last mentioned zone being maintained substantially above said vaporization point, and thereafter transferring the charges successively to a last zone, removing free oil from the product in the last zone with application of a partial vacuum being maintained, and breaking the vacuum in the last zone and removing the dehydrated product before the next charge is received.

5. A method as in claim 4 in which a part of the oil of each charge at the end of said initial evaporating phase is withdrawn, and hot clarified oil introduced into the second named zone to take the place of the withdrawn oil.

6. A method as in claim 5 in which the product is centrifuged in said last named zone while application of a partial vacuum is continued.

References Cited
UNITED STATES PATENTS

| | | | |
|---|---|---|---|
| Re. 25,322 | 1/1963 | Greenfield | 99—204 X |
| 2,473,184 | 6/1949 | Webb | 99—204 |
| 2,502,115 | 3/1950 | Zimmerman | 99—208 |
| 2,549,743 | 4/1951 | Zimmerman | 99—208 |
| 2,709,857 | 6/1955 | Rivoche | 34—51 |
| 2,911,732 | 11/1959 | Webb | 34—193 |

OTHER REFERENCES

Vere-Jones: "A New Zealand Process for Dehydrating Meat," Part I, Food, vol. 26, pp. 294–298 (1957); and Part II, Food, vol. 26, pp. 337–339 (1957).

A. LOUIS MONACELL, *Primary Examiner.*

ABRAHAM WINKELSTEIN, *Examiner.*

R. S. AULL, H. LORD, *Assistant Examiners.*